United States Patent
Asakura

(10) Patent No.: US 10,056,100 B1
(45) Date of Patent: Aug. 21, 2018

(54) MAGNETIC DISC APPARATUS

(71) Applicant: Kabushiki Kaisha Toshiba, Minato-ku, Tokyo (JP)

(72) Inventor: Makoto Asakura, Bunkyo Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/658,461

(22) Filed: Jul. 25, 2017

(30) Foreign Application Priority Data

Feb. 21, 2017 (JP) .................................. 2017-030051

(51) Int. Cl.
  *G11B 5/09* (2006.01)
  *G11B 5/596* (2006.01)
  *G11B 20/12* (2006.01)

(52) U.S. Cl.
  CPC ...... *G11B 5/59633* (2013.01); *G11B 20/1217* (2013.01); *G11B 20/1258* (2013.01)

(58) Field of Classification Search
  None
  See application file for complete search history.

(56) References Cited

U.S. PATENT DOCUMENTS

| | | | |
|---|---|---|---|
| 5,430,581 A | 7/1995 | Moribe et al. | |
| 6,137,644 A | 10/2000 | Hetzler et al. | |
| 6,262,857 B1 | 7/2001 | Hull et al. | |
| 7,929,238 B1* | 4/2011 | Vasquez | G11B 5/5547 360/51 |
| 8,027,117 B1* | 9/2011 | Sutardja | G11B 5/59633 360/51 |
| 8,885,278 B2* | 11/2014 | Asakura | G11B 5/5547 360/48 |
| 9,058,828 B1* | 6/2015 | Cherubini | G11B 5/584 |
| 9,070,411 B1* | 6/2015 | Ellis | G11B 5/59661 |
| 9,384,768 B1* | 7/2016 | Asakura | G11B 5/5526 |
| 2013/0010389 A1* | 1/2013 | Nonaka | G11B 5/82 360/135 |
| 2014/0300991 A1* | 10/2014 | Asakura | G11B 5/5547 360/78.08 |
| 2016/0180873 A1* | 6/2016 | Asakura | G11B 5/5526 360/77.07 |

\* cited by examiner

*Primary Examiner* — Peter Vincent Agustin
(74) *Attorney, Agent, or Firm* — White & Case LLP

(57) ABSTRACT

According to one embodiment, a magnetic disc has N (N is an integer of 2 or more) zones divided in a radial direction, and servo patterns different in servo pattern frequency are recorded in the individual zones. The relationship that the zone width of a K-th (K is an integer of 1 or more and N−1 or less) zone from the outer radial side of the magnetic disc is larger than the zone width of the K+1-th zone adjacent to the K-th zone on the inner diameter side applies to all the K-th zones in which K is 1 or more and N−1 or less.

20 Claims, 17 Drawing Sheets

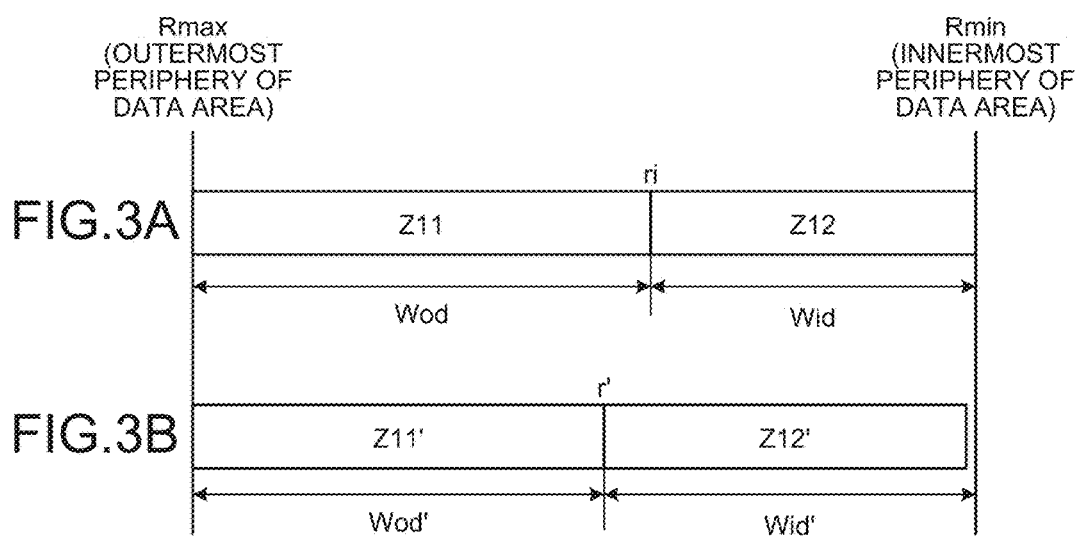

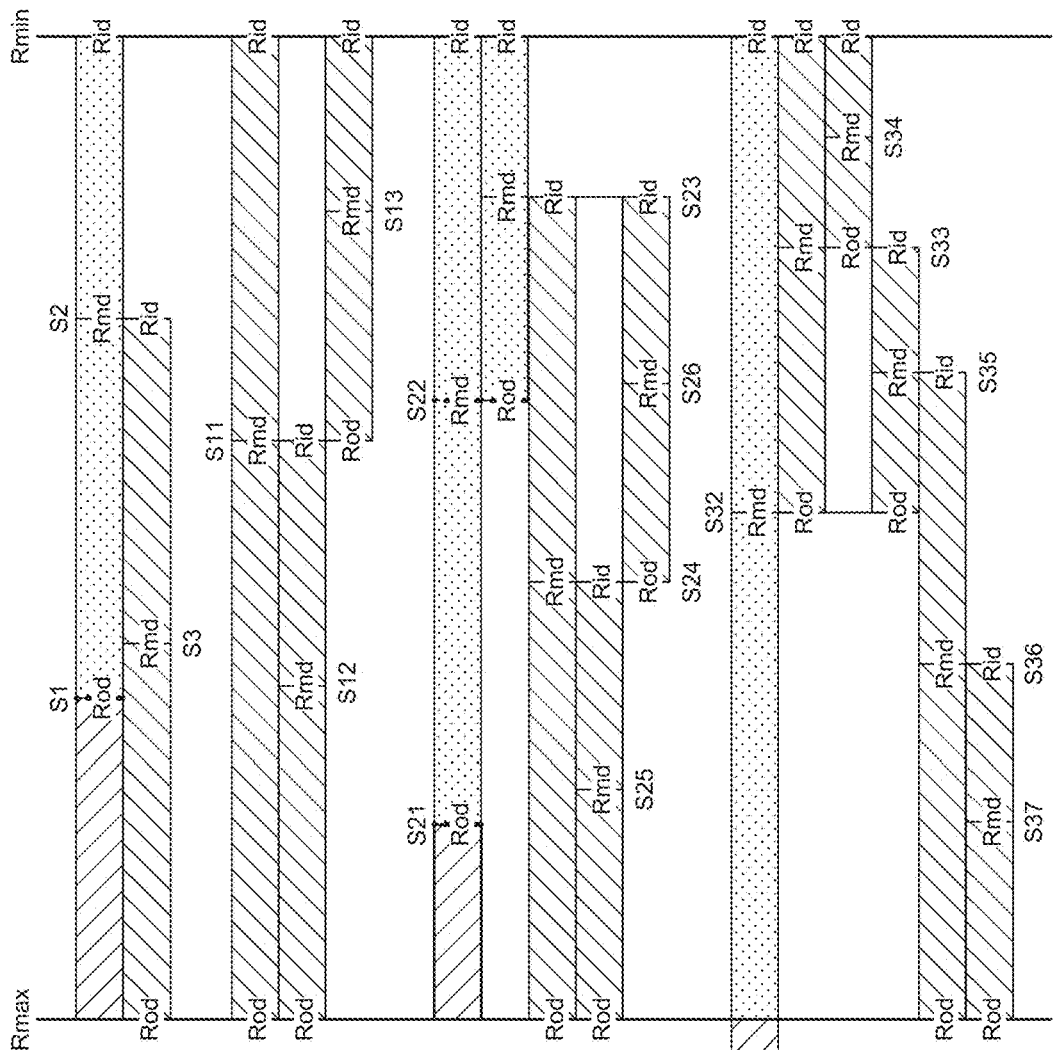

FIG.17

| NUMBER OF DIVIDED ZONES | ZONE BOUNDARY INVALID WIDTH=0μm | | ZONE BOUNDARY INVALID WIDTH=10μm | |
|---|---|---|---|---|
| | SERVO LOSS RATE [%] | AREA GAIN | SERVO LOSS RATE [%] | AREA GAIN |
| NON-DIVIDING | 5.388 | 0 | 5.388 | 0 |
| TWO-ZONE DIVIDING | 4.372 | 1.074 | 4.387 | 1.058 |
| THREE-ZONE DIVIDING | 1.124 | 1.337 | 4.133 | 1.327 |
| FOUR-ZONE DIVIDING | 4.013 | 1.453 | 4.019 | 1.447 |
| FIVE-ZONE DIVIDING | 3.951 | 1.519 | 3.955 | 1.515 |
| SIX-ZONE DIVIDING | 3.910 | 1.562 | 3.914 | 1.558 |
| SEVEN-ZONE DIVIDING | 3.884 | 1.590 | 3.885 | 1.589 |
| EIGHT-ZONE DIVIDING | 3.862 | 1.613 | 3.864 | 1.611 |

US 10,056,100 B1

MAGNETIC DISC APPARATUS

CROSS-REFERENCE TO RELATED APPLICATIONS

This application is based upon and claims the benefit of priority from Japanese Patent Application No. 2017-30051, filed on Feb. 21, 2017; the entire contents of which are incorporated herein by reference.

FIELD

Embodiments described herein relate generally to a magnetic disc apparatus.

BACKGROUND

There is a method for increasing a data area into which user data is to be written in a magnetic disc apparatus by which a servo pattern is divided into a plurality of zones from the inner periphery to outer periphery of a magnetic disc and the write frequency (reference frequency) of the servo pattern in the outer periphery zone is made higher than that in the inner periphery zone (zone servo method).

BRIEF DESCRIPTION OF THE DRAWINGS

FIG. 3A is a diagram illustrating a method for dividing the magnetic disc into two zones with a servo pattern according to the first embodiment, and FIG. 3B is a diagram illustrating a method for dividing the magnetic disc equally into two zones with a servo pattern in a radial direction;

FIG. 10A is a diagram illustrating a method for three-zone dividing with a servo pattern according to a third embodiment, FIG. 10B is a diagram illustrating a method for four-zone dividing with a servo pattern according to the third embodiment, FIG. 10C is a diagram illustrating a method for five-zone dividing with a servo pattern according to the third embodiment, and FIG. 10D is a diagram illustrating a method for seven-zone dividing with a servo pattern according to the third embodiment;

FIG. 17 is a diagram illustrating the relationships among the number of divided zones with a servo pattern, servo loss rate, and area gain.

DETAILED DESCRIPTION

According to the embodiment, a magnetic disc apparatus includes a magnetic disc having N (N is an integer of 2 or more) zones divided in a radial direction and a magnetic head provided for the magnetic disc. Servo patterns different in servo pattern frequency are recorded in the respective zones. The relationship that the zone width of a K-th (K is an integer of 1 or more and N−1 or less) zone from the outer radial side of the magnetic disc is larger than the zone width of the K+1-th zone adjacent to the K-th zone on the inner radial side applies to all the K-th zones in which K is 1 or more and N−1 or less.

Exemplary embodiments of a magnetic disc apparatus will be explained below in detail with reference to the accompanying drawings. The present invention is not limited to the following embodiments.

First Embodiment

Figure 1:
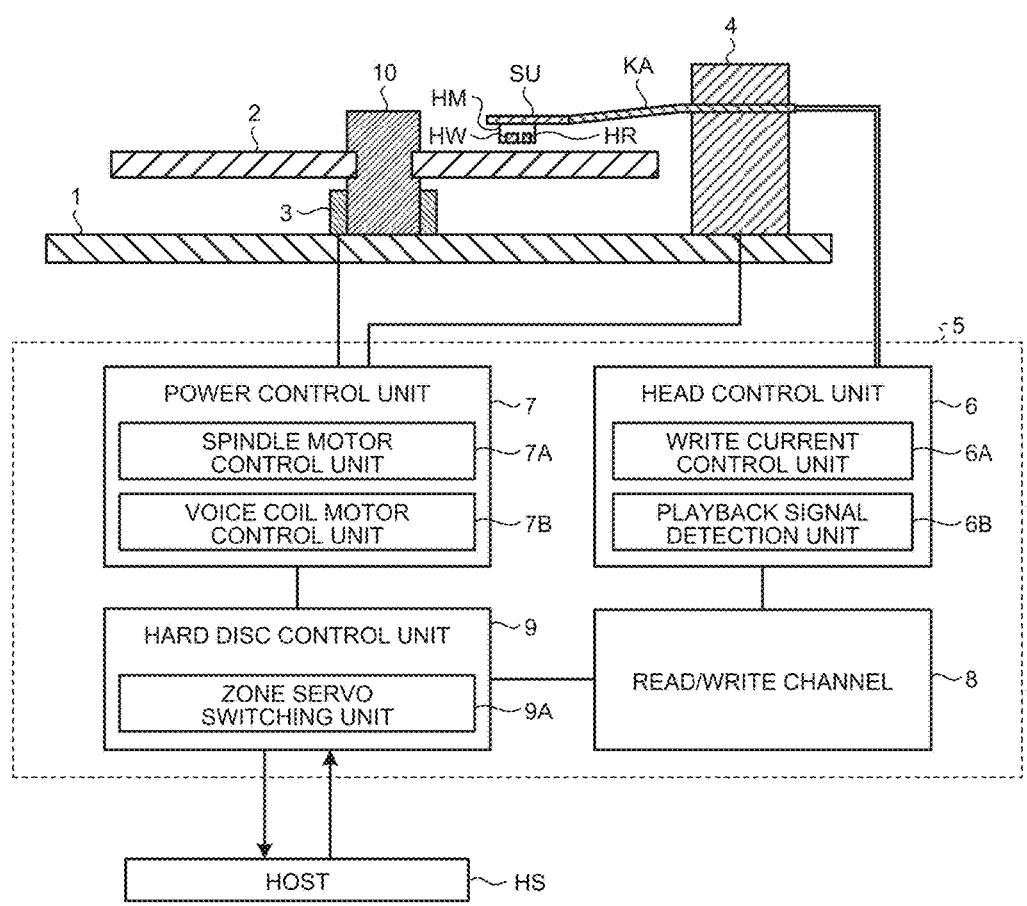
FIG. 1 is a schematic block diagram of a magnetic disc apparatus according to a first embodiment.

FIG. 1 is a schematic block diagram of a magnetic disc apparatus according to a first embodiment.

Referring to FIG. 1, the magnetic disc apparatus has a magnetic disc 2 that is supported by a base 1 via a spindle 10.

Figure 2A:
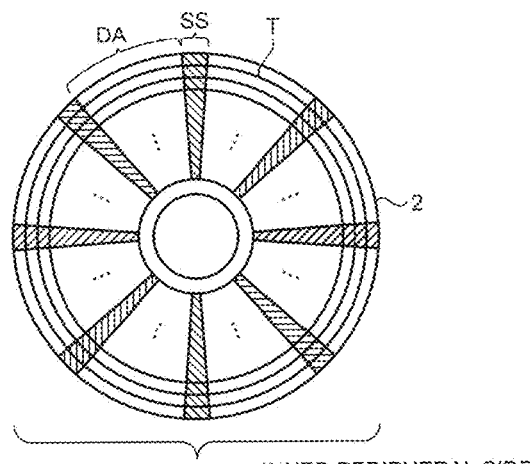
FIG. 2A is a plane view of track arrangement in a magnetic disc illustrated in FIG. 1.
Figure 2B:
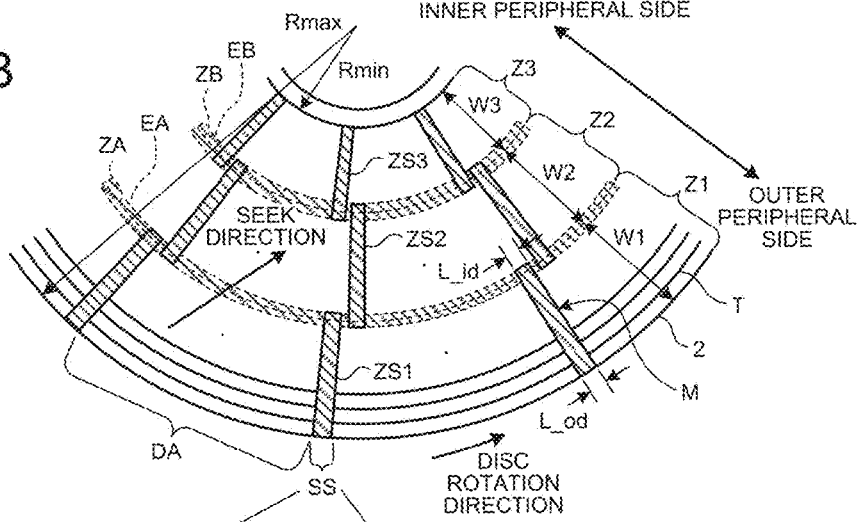
FIG. 2B is a diagram illustrating a configuration of zones in which servo patterns are arranged.
Figure 2C:
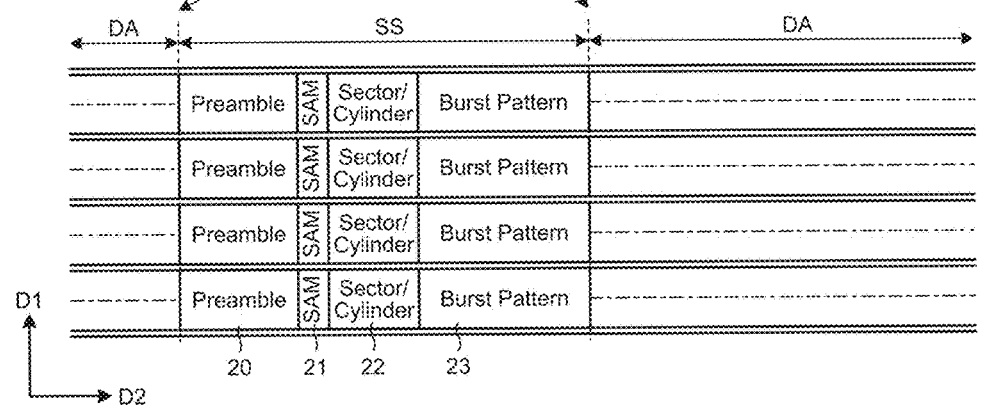
FIG. 2C is a diagram illustrating a configuration example of the servo patterns illustrated in FIG. 2B.

FIG. 2A is a plane view of track arrangement in the magnetic disc illustrated in FIG. 1, FIG. 2B is a diagram illustrating a configuration of zones in which servo patterns are arranged, and FIG. 2C is a diagram illustrating a configuration example of servo areas illustrated in FIG. 2B. FIG. 2B illustrates an example in which the disc is divided into three zones by the zone servo method.

Referring to FIGS. 2A to 2C, tracks T are provided along a circumferential direction D2. The tracks T each have data areas DA into which user data is to be written and servo areas SS in which servo data is written. In this example, the servo areas SS are radially arranged and the data areas DA are arranged between the servo areas SS along the circumferential direction D2.

As illustrated in FIG. 2B, the magnetic disc 2 is divided into zones Z1 to Z3 in a radial direction D1. In the servo areas SS, servo patterns ZS1 to ZS3 different in servo pattern frequency are respectively arranged in the zones Z1 to Z3, and the servo patterns ZS1 to ZS3 are shifted from each other in the circumferential direction D2.

In this case, the servo pattern frequency can be higher in the outer peripheral zone Z1 than in the inner peripheral zone Z2. For example, the servo pattern frequency can be set to 200 MHz in the zone Z1, the servo pattern frequency can be set to 150 MHz in the zone Z2, and the servo pattern frequency can be set to 100 MHz in the zone Z3. By setting the servo pattern frequency to be higher on the outer peripheral side than the inner peripheral side, it is possible to reduce the spaces for the servo patterns ZS1 to ZS3 and increase the data areas DA as compared to the case where the servo pattern frequency is set as be constant in the zones Z1 to Z3.

When the zone widths of the zones Z1 to Z3 are respectively designated as W1 to W3, the relationship W1>W2>W3 holds. At that time, the relationships 1.25≥W1/W2>1.05 and 1.25≥W2/W3>1.05 can be satisfied. By setting the zone width on the outer peripheral side to be larger than the zone width on the inner peripheral side between the zones adjacent to each other in the radial direction D1, it is possible to decrease the areas of the servo patterns ZS1 to ZS3 and increase the data areas DA as compared to the case where the zone widths W1 to W3 are set to be equal.

The servo patterns ZS1 and ZS2 are arranged in such a manner that their ends overlap with a gap therebetween, and the servo patterns ZS2 and ZS3 are arranged in such a manner that their ends overlap with a gap therebetween. In this case, by providing the overlap between the servo patterns ZS1 and ZS2 and the overlap between the servo patterns ZS2 and ZS3, it is possible to prevent the servo patterns ZS1 to ZS3 from not being detected after switching among the servo patterns ZS1 to ZS3 even with an error in the timing for switching among the servo patterns ZS1 to ZS3. This allows correct servo processing.

A zone boundary ZA is provided near the track overlapping the zones Z1 and Z2, and a zone boundary ZB is provided near the track overlapping the zones Z2 and Z3. In addition, an invalid section EA is provided along the zone boundary ZA, and an invalid section EB is provided along the zone boundary ZB. The invalid sections EA and EB cannot be accessed in the data areas DA.

In the example of FIG. 2B, the method of dividing the magnetic disc 2 into three zones Z1 to Z3 is described. However, the magnetic disc 2 may be divided into N (N is an integer of 2 or more) zones in the radial direction D1. In this case, the zone-width relationship that the zone width of a K-th (K is an integer of 1 or more and N−1 or less) zone from the outer radial side of the magnetic disc 2 is larger than the zone width of the K+1-th zone adjacent to the K-th zone on the inner radial side applies to all the K-th zones in which K is 1 or more and N−1 or less. In addition, the zone width of the K-th zone is designated as Wod and the zone width of the K+1-th zone as Wid, the relationship 1.25≥Wod/Wid>1.05 holds.

As illustrated in FIG. 2C, the servo areas SS each have a preamble 20, a servo area mark 21, sector/cylinder information (gray code) 22, and a burst pattern 23. The sector/cylinder information 22 can give servo addresses of the magnetic disc 2 in the circumferential direction D2 and the radial direction D1, which can be used for seek control under which the magnetic head is moved to a target track. The burst pattern 23 can be used for tracking control under which the magnetic head is positioned within the range of a target track. The burst pattern 23 may be a null-type burst pattern, an area-type burst pattern, or a phase difference-type pattern.

Referring to FIG. 1, the magnetic disc apparatus has a head slider HM. The head slider HM has a write head HW and a read head HR as magnetic heads. The write head HW and the read head HR are opposed to the magnetic disc 2. The head slider HM is held over the magnetic disc 2 via a suspension SU and a carriage arm KA. The carriage arm KA is slidable on the head slider HM in a horizontal plane at the seek time. The suspension SU applies a pressing force to the magnetic head against the floating force of the magnetic head resulting from an air flow with the rotation of the magnetic disc 2, thereby to keep constant the floating amount of the magnetic head over the magnetic disc 2. The suspension SU can be formed from a plate spring.

The magnetic disc apparatus also has a voice coil motor 4 that drives the carriage arm KA and a spindle motor 3 that rotates the magnetic disc 2 around the spindle 10. The voice coil motor 4 and the spindle motor 3 are fixed to the base 1.

The magnetic disc apparatus also has a control unit 5 that controls the operations of the magnetic disc apparatus. The control unit 5 can control the positions of the write head HW and the read head HR with respect to the magnetic disc 2 based on the servo data read by the read head HR. The control unit 5 has a head control unit 6, a power control unit 7, a read/write channel 8, and a hard disc control unit 9.

The head control unit 6 has a write current control unit 6A and a playback signal detection unit 6B. The power control unit 7 has a spindle motor control unit 7A and a voice coil motor control unit 7B.

The head control unit 6 amplifies or detects a signal at the time of recording and replaying. The write current control unit 6A controls a write current flowing through the write head HW. The playback signal detection unit 6B detects the signal read by the read head HR.

The power control unit 7 drives the voice coil motor 4 and the spindle motor 3. The spindle motor control unit 7A controls the rotation of the spindle motor 3. The voice coil motor control unit 7B controls driving of the voice coil motor 4.

The read/write channel 8 passes data between the head control unit 6 and the hard disc control unit 9. The data includes read data, write data, and servo data. For example, the read/write channel 8 converts the signal to be replayed by the read head HR into a data format that can be handled by a host HS or converts the data output from the host HS into a signal format that can be recorded on the write head HW. The format conversion includes DA conversion, encoding, AD conversion, and decoding. The read/write channel 8 also decodes the signal replayed by the read head HR and subjects the data output from the host HS to code modulation.

The hard disc control unit 9 controls recording and replaying under instructions from the outside of the magnetic disc apparatus (for example, the host HS) and passes data between the outside and the read/write channel 8. The hard disc control unit 9 has a zone servo switching unit 9A. The zone servo switching unit 9A can change servo process depending on the zones Z1 to Z3 where the magnetic head is located. The servo process change includes change of servo frequencies, change of servo gate generation timings, change of filter bands, and others.

The hard disc control unit 9 may have separately a processor that controls recording and replaying and a processor that controls passing of data between the host HS and the read/write channel 8. Alternatively, the same processor may be used for recording and replaying control and data passage control. The processor can be a CPU.

The control unit 5 is connected to the host HS. The host HS may be a personal computer that issues a write command and a read command to the magnetic disc apparatus or a network connectable to a server or the like. That is, the magnetic disc apparatus can be used as an external storage apparatus for the host HS. The magnetic disc apparatus may be externally attached to the host HS or may be built in the host HS.

While the spindle motor 3 rotates the magnetic disc 2, the magnetic head reads a signal from the magnetic disc 2 and the playback signal detection unit 6B detects the signal. The read/write channel 8 subjects the signal detected by the playback signal detection unit 6B to data conversion and sends the same to the hard disc control unit 9. The hard disc control unit 9 performs a tracking control on the magnetic head based on the burst pattern 23 included in the signal detected by the playback signal detection unit 6B.

The current position of the magnetic head is calculated based on the sector/cylinder information 22 included in the signal detected by the playback signal detection unit 6B, and the magnetic head is brought into a seek control to come closer to the target position. When the magnetic head is under the seek control, it is determined whether the magnetic head will cross the zone boundaries ZA and ZB. When it is determined that the magnetic head will cross the zone boundaries ZA and ZB, the servo frequency and the servo gate generation timing are changed in correspondence to the crossed zones Z1 to Z3.

For the case of dividing the magnetic disc into two zones with a servo pattern, a method for calculating the divided position with the minimum occupancy rate of the servo area will be described with the use of equations.

FIG. 3A is a diagram illustrating a method for dividing the magnetic disc into two zones with a servo pattern according to the first embodiment, and FIG. 3B is a diagram illustrating a method for dividing the magnetic disc equally into two zones with a servo pattern in a radial direction.

Referring to FIGS. 3A and 3B, the data area DA of the magnetic disc 2 illustrated in FIG. 2B has an outermost radius Rmax and an innermost radius Rmin.

As illustrated in FIG. 3B, in equal dividing, the divided position r' between zones Z11' and Z12' is (Rmax+Rmin)/2. When the zone width of the zone Z11' is designated as Wod' and the zone width of the zone Z12' as Wid', the relationship Wod'=Wid' holds.

Meanwhile, as illustrated in FIG. 3A, a divided position ri with the minimum occupancy rate of the servo area between the zones Z11 and Z12 can be calculated as described below. The servo area includes the area of the magnetic disc 2 for a period of time during which the servo gate is on and an area not usable as data area due to a reading/writing gap on the magnetic head and a wasteful time for switching between reading and writing. However, the divided position with the minimum occupancy rate of the servo area can be calculated with consideration given to only the area on the magnetic disc 2 for a period of time during which the servo gate is on. The area of only one servo sector for a period of time during which the servo gate is on will be hereinafter called servo loss.

According to the method for two-zone dividing with a servo pattern, there is only one zone boundary between the outermost radius Rmax and the innermost radius Rmin. In this case, the servo loss S can be determined from the area of a trapezoid in which an external end portion length L_od and an inner end portion length L_id of one servo sector for a period of time during which the servo gate is on. For example, referring to FIG. 2B, the area of one trapezoid zone on the outermost periphery of one servo sector can be given as an area M of one servo pattern ZS1.

In the case of two-zone dividing, there are two trapezoids and the servo loss S can be given with a radial position r by Equation (1) as follows:

$$S=(Rmax-r)*(L\_od0+L\_id0)/2+(r-Rmin)*(L\_od1+L\_id1)/2 \quad (1)$$

where $$L\_od0=V(Rmax)*(T\_SG/SFGrate)$$

$$L\_id0=V(r)*(T\_SG/SFGrate)$$

$$L\_od1=V(r)*T\_SG$$

$$L\_id1=V(Rmin)*T\_SG$$

In the foregoing equation, V represents a linear speed at a radial position, T_SG represents a period of time during which the servo gate is on in a clock cycle in the inner peripheral zone, and SFGrate represents the clock ratio of a servo frequency in each zone relative to the servo frequency in the innermost peripheral zone. Servo frequency generation (SFG) represents the reversal rate of magnetic poles SN per unit time.

Based on the assumption that the servo frequency is set under the inner peripheral flux change per inch (FCI) standards, Equation (1) is modified to obtain Equation (2) as follows:

$$S = \text{fact} * \{(R\max - r)*(R\max + r)*R\min/r + (r - R\min)*(r + R\min)\} \quad (2)$$

where $$\text{fact} = \pi * T\_SG/Tspm$$

In the foregoing equation, Tspm represents the rotation speed of the spindle motor 3, and the flux change per inch (FCI) represents the reverse rate of the magnetic poles SN per inch. The inner peripheral FCI standards refers to a method for setting the servo frequency such that the FCI with the possible innermost radius Rmin in the data area DA is regarded as the maximum FCI that can assure the signal-noise (SN) ratio and the FCIs in the inner peripheral portions of the zones are all maximum.

In this case, when the innermost radius of the zone N is designated as Rid N, the servo frequency SFG N in the zone N can be given by Equation (3) as follows:

$$SFG\_N = SFG\_ID * Rid\_N/R\min \quad (3)$$

where SFG_ID represents the innermost peripheral servo frequency.

Accordingly, the inner peripheral FCIs in the zones can be kept to the maximum at any time.

To determine the radial position r where the servo loss S in Equation (1) is minimum, r is calculated by differential equation D(r)=0 obtained by differentiating Equation (1) with respect to r. In this case, the differential equation D(r) can be given by Equation (4) as follows:

$$D(r) = \text{fact} * (2*r^3 - R\min*r^2 - R\max^2*R\min)/r^2 \quad (4)$$

The radial position r where 0 is obtained in Equation (4) can be given by Equation (5) as follows:

$$r = (x*R\max + R\min)/2 \quad (5)$$

where $$Y(x) = x*(x+k)^2 - 4*k = 0 \quad (6)$$

$$k = R\max/R\min$$

To minimize the occupancy rate of the servo area arranged in the zones Z11 and Z12 illustrated in FIG. 3A, the radial position r given by Equation (5) is set to the divided position ri. In this case, when the zone width of the zone Z11 is designated as Wod and the zone width of the zone Z12 as Wid, the relationship Wod>Wid holds.

Figure 4A:
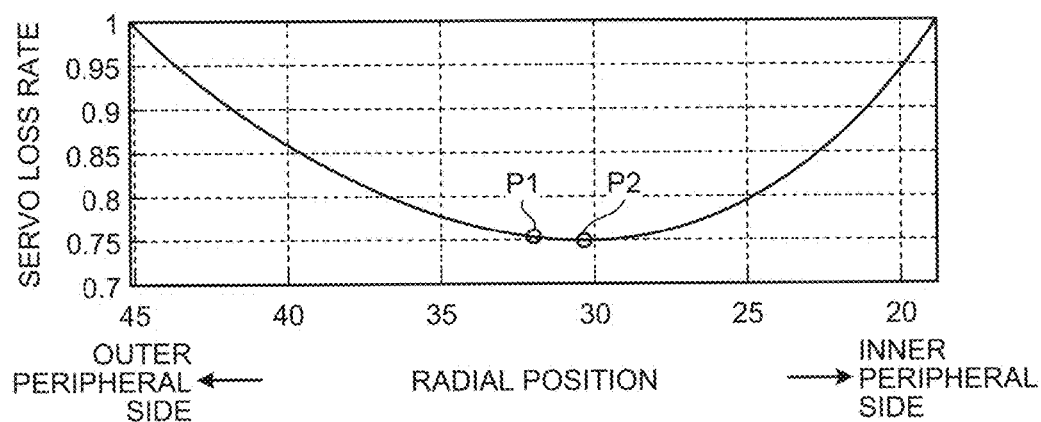
FIG. 4A is a diagram illustrating the relationship between two-zone divided position with a servo pattern and servo loss rate according to the first embodiment.
Figure 4B:
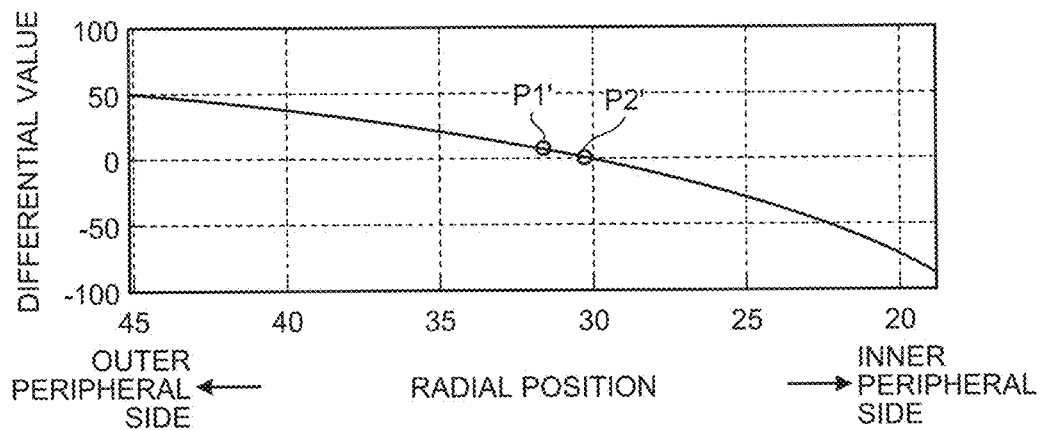
FIG. 4B is a diagram illustrating the relationship between the divided position illustrated in FIG. 4A and the differential value of the servo loss rate.

FIG. 4A is a diagram illustrating the relationship between two-zone divided position with a servo pattern and servo loss rate according to the first embodiment, and FIG. 4B is a diagram illustrating the relationship between the divided position illustrated in FIG. 4A and the differential value of the servo loss rate. The servo loss rate illustrated in FIG. 4A is the ratio of the servo loss S in Equation (1) to the servo loss without dividing.

Referring to FIG. 4A, the servo loss rate corresponding to the position of the equal dividing illustrated in FIG. 3B is located at a point P1, and the servo loss rate is not minimum. Meanwhile, the servo loss rate corresponding to the position of the dividing illustrated in FIG. 3A is located at a point P2, and the servo loss rate is minimum.

Referring to FIG. 4B, at a point P1' corresponding to the position of the equal dividing illustrated in FIG. 3B, the value of the differential equation D(r) of Equation (4) is not 0. Meanwhile, at a point P2' corresponding to the position of the dividing illustrated in FIG. 3A, the value of the differential equation D(r) of Equation (4) is 0.

Figure 5A:
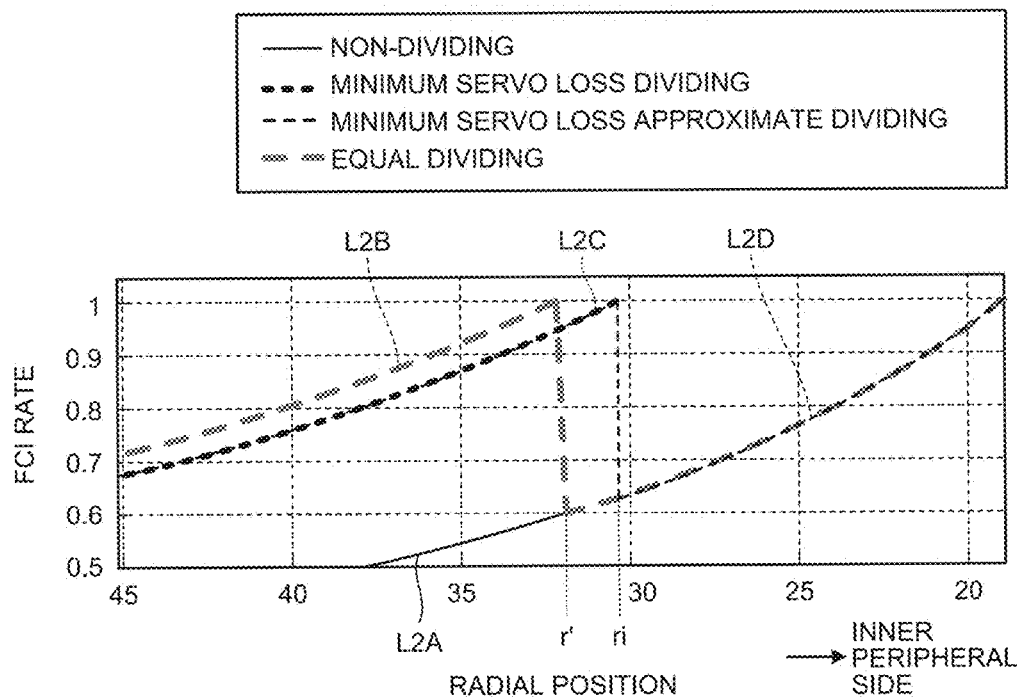
FIG. 5A is a diagram illustrating the relationship between two-zone divided position with a servo pattern and FCI rate according to the first embodiment.
Figure 5B:
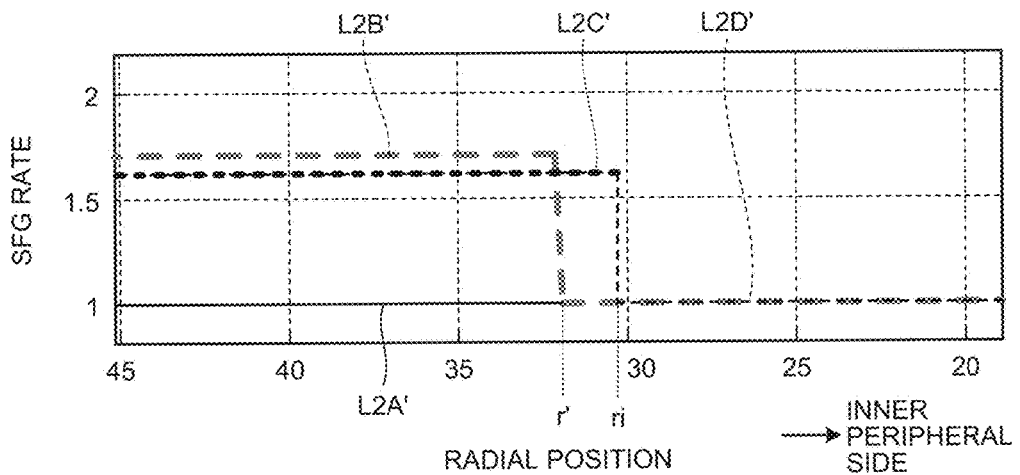
FIG. 5B is a diagram illustrating the relationship between two-zone divided position with a servo pattern and SFG rate according to the first embodiment.

FIG. 5A is a diagram illustrating the relationship between two-zone divided position with a servo pattern and FCI rate according to the first embodiment, and FIG. 5B is a diagram illustrating the relationship between two-zone divided position with a servo pattern and SFG rate according to the first embodiment. The method for dividing with the minimum occupancy rate of the servo area will be called minimum servo loss dividing.

Referring to FIG. 5A, non-dividing FCI rate L2A gradually declines from the inner peripheral side toward the outer peripheral side. Equal-dividing FCI rate L2B gradually declines from the inner peripheral side toward the divided position r', then rises at the divided position r', and then gradually declines from the divided position r' toward the outer peripheral side. Minimum servo loss-dividing FCI rate L2C gradually declines from the inner peripheral side toward the divided position ri, then rises at the divided position ri, and then gradually declines from the divided position ri toward the outer peripheral side.

Referring to FIG. 5B, non-dividing SFG rate L2A' is constant. Equal-dividing SFG rate L2B' is constant from the innermost periphery toward the divided position r', then rises at the divided position r', and then is constant from the divided position r' toward the outermost periphery. Minimum servo loss-dividing SFG rate L2C' is constant from the innermost periphery toward the divided position ri, then rises at the divided position ri, and then is constant from the divided position ri toward the outermost periphery.

Referring to FIGS. 5A and 5B, the divided position in minimum servo loss dividing is shifted toward the inner peripheral side as compared to that in the equal dividing. Accordingly, the servo frequency on the outer peripheral side set under the inner peripheral FCI standards in the minimum servo loss dividing is lower than that in the equal dividing. This makes it possible to, even with degradation in the quality of the SN ratio on the outer peripheral side resulting from the relationship between the skew angle of the magnetic head and servo track write (STW) or external perturbations, lessen the outer peripheral FCI without lowering the servo frequency on the outer peripheral side as in the case of the equal dividing.

As described in Equation (5), the divided position ri with the minimum occupancy rate of the servo area depends on the outermost radius Rmax. Accordingly, the dividing rate at the divided position ri with the minimum occupancy rate of the servo area varies between 3.5 inch-diameter media and 2.5 inch-diameter media.

Equation (6) is a cubic equation in which there always exists a real solution within the range of 0<x<1. Accordingly, it is possible to determine accurately the solution of the k theoretical equation from Cardano's formula. However, the solution is a complicated equation less in practical utility. Thus, x may be approximate in Equation (7) as follows:

$$x = 1 - 0.05 * (k-1)^{3/2} \quad (7)$$

The dividing method with x approximated in Equation (7) will be called minimum servo loss approximate dividing.

It can be seen from FIGS. 5A and 5B that an FCI rate L2D and an SFG rate L2D' of the minimum servo loss approximate dividing are equal to an FCI rate L2C and an SFG rate L2C' of the minimum servo loss dividing.

Figure 6A:
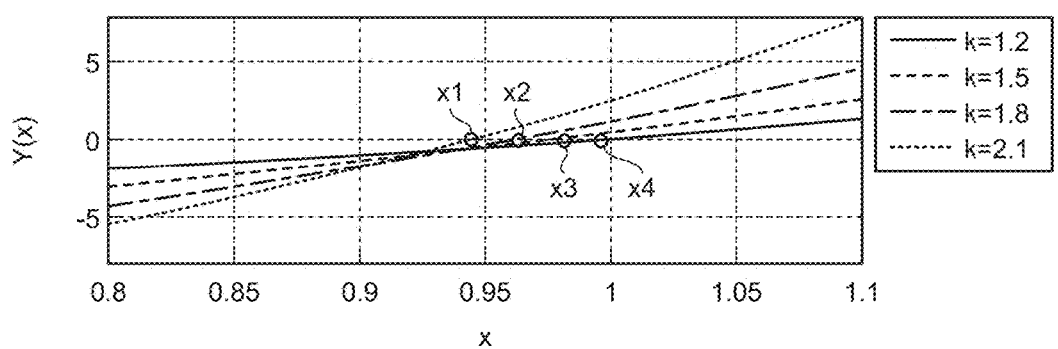
FIG. 6A is a diagram illustrating curves corresponding to the differential equation of the relationship between two-zone divided position with a servo pattern and servo loss rate with the ratio of zone diameter as a parameter according to the first embodiment.
Figure 6B:
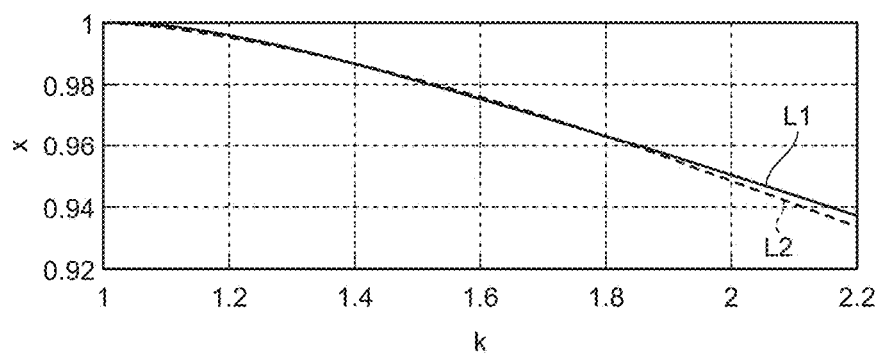
FIG. 6B is a diagram illustrating the relationship between the ratio of zone diameter and the weight of the outer diameter to the inner diameter when the differential equation described in FIG. 6A is 0.

FIG. 6A is a diagram illustrating curves corresponding to the differential equation of the relationship between two-zone divided position with a servo pattern and servo loss rate with the ratio of zone diameter as a parameter according to the first embodiment, FIG. 6B is a diagram illustrating the relationship between the ratio of zone diameter and the weight of the outer diameter to the inner diameter when the differential equation described in FIG. 6A is 0.

Referring to FIG. 6A, the horizontal axis indicates x in Equation (6) and the vertical axis indicates Y(x) in Equation (6). Point x1 represents x where Y(x)=0 when k=2.1, point x2 represents x where Y(x)=0 when k=1.8, point x3 represents x where Y(x)=0 when k=1.5, and point x4 represents x3 where Y(x)=0 when k=1.2. As k becomes larger, x in Y(x)=0 becomes smaller. That is, as k becomes larger, the zone width ratio Wod/Wid becomes larger as well. Accordingly, the zone width ratio Wod/Wid varies between 3.5 inch-diameter media and 2.5 inch-diameter media due to the difference in k.

Referring to FIG. 6B, the horizontal axis of L1 indicates k in Equation (6) and the vertical axis of L1 indicates x where Y(x)=0 in Equation (6). L2 indicates the relationship between k and x in Equation (6). It can be seen that L1 and L2 are almost the same in the practical range of k for use in the magnetic disc apparatus. Accordingly, it is possible to maintain the accuracy of calculating the divided position with the minimum servo loss S even when x is calculated using Equation (7) instead of Equation (6).

The zone width ratio a=Wod/Wid with x calculated using Equation (7) instead of Equation (6) can be given by Equation (8) as follows:

$$a=Wod/Wid=(R\max-r)/(r-R\min)=\{(k-1)-k(x-1)/(k-1)+k(x-1)\} \quad (8)$$

The high-order terms in Equation (8) cancel each other out, which allows linear approximation in proportion to (k−1). The primary linear approximation in Equation (8) can be given by Equation (9):

$$a=Wod/Wid=1-0.22(k-1) \quad (9)$$

Figure 7A:
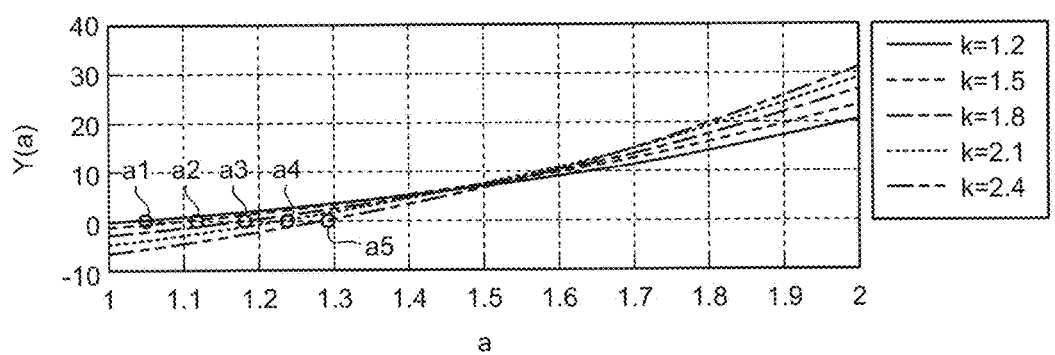
FIG. 7A is a diagram illustrating curves in which the weight of the outer diameter to the inner diameter in the differential equation described in FIG. 6A is substituted by the ratio of zone width with the ratio of zone diameter as a parameter.
Figure 7B:
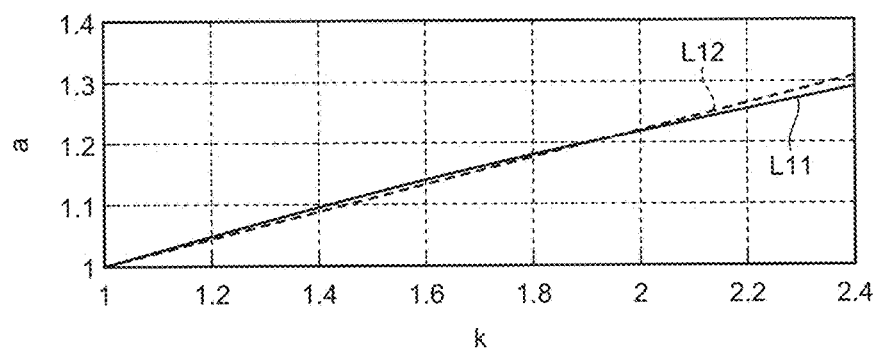
FIG. 7B is a diagram illustrating the relationship between the ratio of zone diameter and the ratio of zone width where the differential equation described in FIG. 7A is 0.

FIG. 7A is a diagram illustrating curves in which the weight of the outer diameter to the inner diameter in the differential equation described in FIG. 6A is substituted by the ratio of zone width with the ratio of zone diameter as a parameter, and FIG. 7B is a diagram illustrating the relationship between the ratio of zone diameter and the ratio of zone width where the differential equation described in FIG. 7A is 0.

Referring to FIG. 7A, the horizontal axis indicates the value of a in Equation (8) and the vertical axis indicates the value of Y(x) in Equation (6) as Y(a). Point a1 represents a where Y(a)=0 when k=1.2, point a2 represents a where Y(a)=0 when k=1.5, point a3 represents a where Y(a)=0 when k=1.8, point a4 represents a where Y(a)=0 when k=2.1, and point a5 represents a where Y(a)=0 when k=2.4. As k becomes larger, a where Y(a)=0 becomes larger as well.

Referring to FIG. 7B, the horizontal axis of L11 indicates k in Equation (8) and the vertical axis of L11 indicates a in Equation (8). L12 indicates the relationship between k and a in Equation (9). It can be seen that L11 and L12 are almost the same in the practical range of k for use in the magnetic disc apparatus. Accordingly, it is possible to maintain the accuracy of calculating the divided position with the minimum servo loss S even when a is calculated using Equation (9) instead of Equation (8).

Second Embodiment

Figure 8:
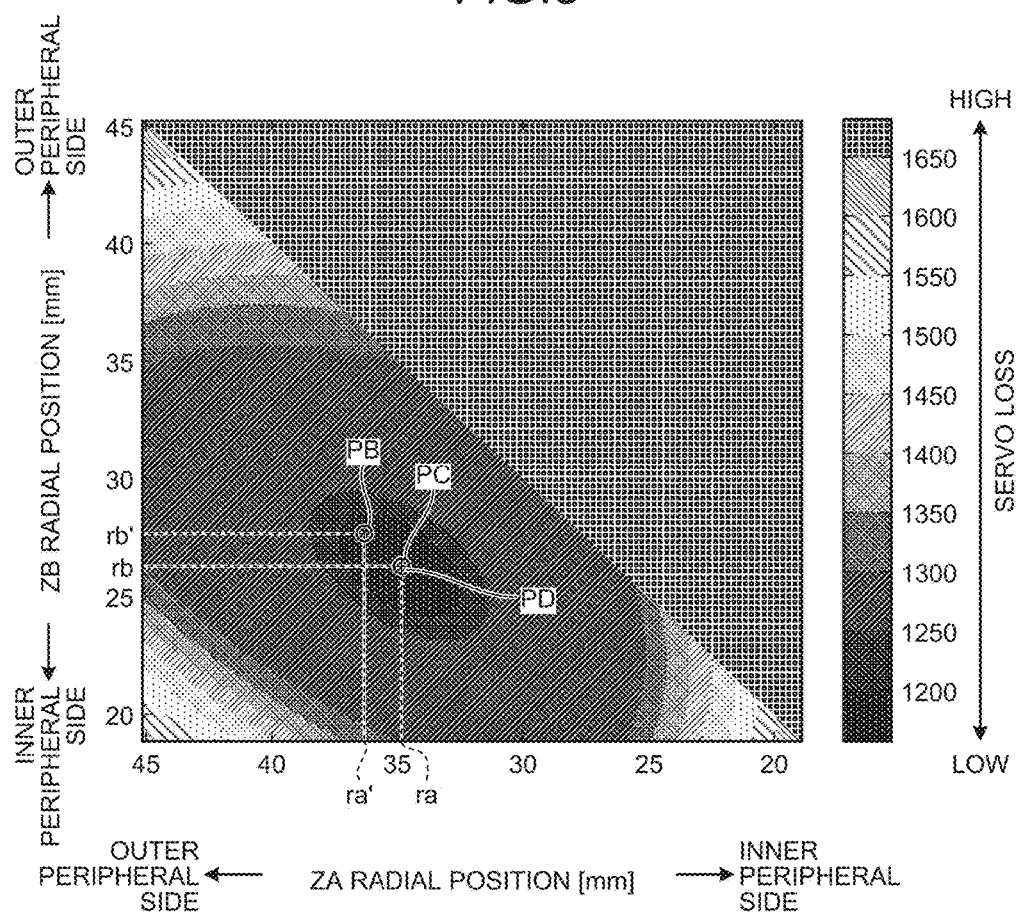
FIG. 8 is a diagram illustrating the relationship between three-zone divided positions with a servo pattern and servo loss rate according to a second embodiment.

FIG. 8 is a diagram illustrating the relationship between three-zone divided positions with a servo pattern and servo loss rate according to a second embodiment.

Referring to FIG. 8, PB represents the divided position in the equal dividing and PC represents the divided position in the minimum servo loss dividing. Specifically, in the equal dividing, the radial position of the zone boundary ZA illustrated in FIG. 2B is set to a divided position ra' and the radial position of the zone boundary ZB is set to a divided position rb'. In the minimum servo loss dividing, the radial position of the zone boundary ZA is set to a divided position ra and the radial position of the zone boundary ZB is set to a divided position rb. In three-zone dividing as well, it can be seen that the servo loss is smaller when the divided positions are set such that the zone width is larger on the outer radial side than the inner radial side.

Figure 9A:
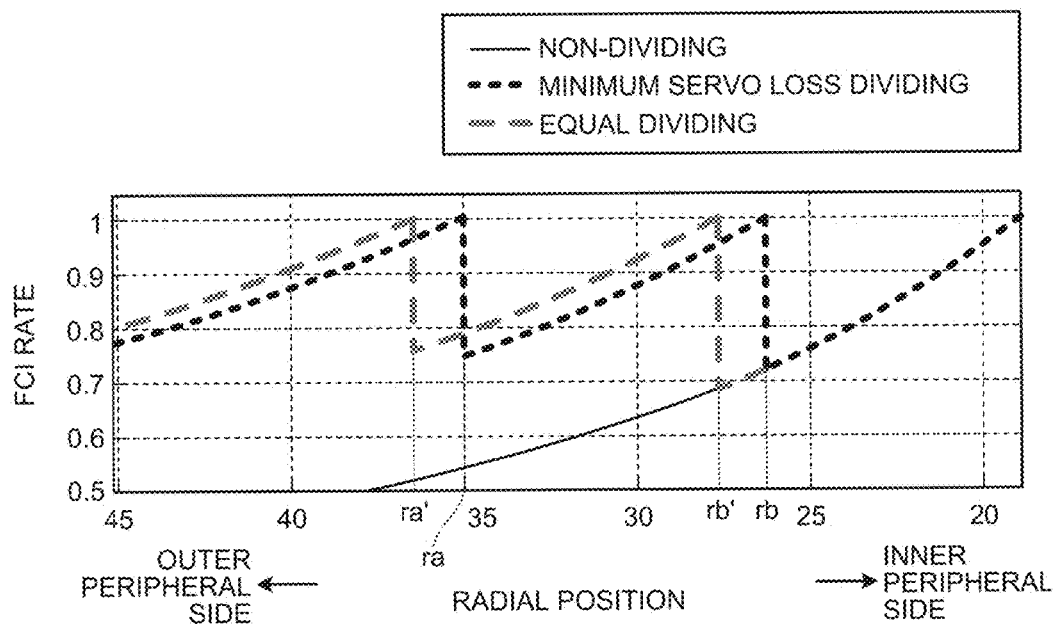
FIG. 9A is a diagram illustrating the relationship between three-zone divided positions with a servo pattern and FCI rate according to the second embodiment.
Figure 9B:
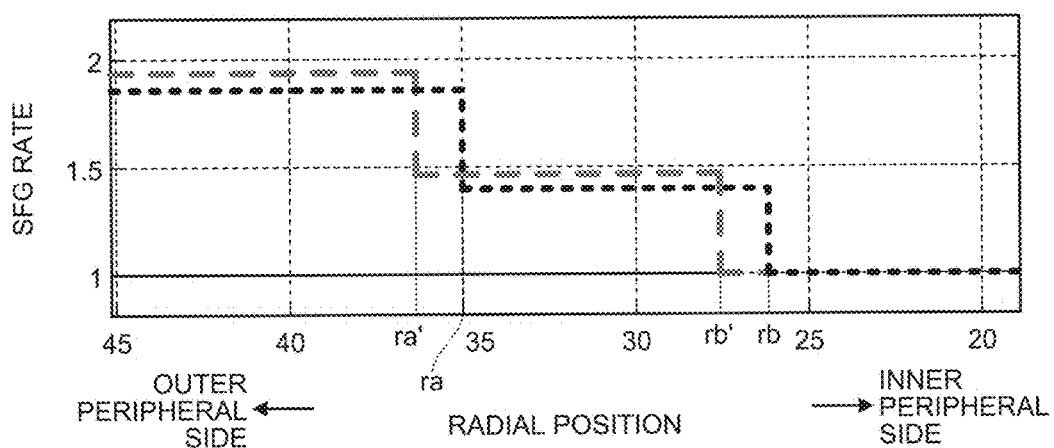
FIG. 9B is a diagram illustrating the relationship between three-zone divided positions with a servo pattern and SFG rate according to the second embodiment.

FIG. 9A is a diagram illustrating the relationship between three-zone divided positions with a servo pattern and FCI rate according to the second embodiment, and FIG. 9B is a diagram illustrating the relationship between three-zone divided positions with a servo pattern and SFG rate according to the second embodiment.

Referring to FIGS. 9A and 9B, in the case of three-zone dividing, the divided positions ra and rb between the adjacent zones in the minimum servo loss dividing are shifted to the inner peripheral side as compared to the divided positions ra' and rb' in the equal dividing. Accordingly, the servo frequency on the outer peripheral side set under the inner peripheral FCI standards in the minimum servo loss dividing is lower than that in the equal dividing. Accordingly, even with degradation in the quality of the SN ratio on the outer peripheral side, it is possible to lessen the outer peripheral FCI without lowering the servo frequency on the outer peripheral side as in the equal dividing.

Third Embodiment

The methods for analytically determining the divided positions with the minimum servo loss dividing in the case of two-zone dividing and three-zone dividing have been described so far. In dividing the disc area into three or more zones, however, the analytically determined divided positions with the minimum servo loss dividing would be complicated. Accordingly, descriptions will be hereinafter given to a dividing method by which to simply determine divided positions very close to the divided positions with the minimum servo loss dividing.

FIG. 10A is a diagram illustrating a method for three-zone dividing with a servo pattern according to a third embodiment.

Referring to FIG. 10A, the disc area between the outermost radius Rmax and the innermost radius Rmin is equally divided into three zones to set a provisional divided position Rod on the outer peripheral side (S1).

Next, the provisional divided position Rod determined at S1 is set as an outermost radius Rod in two-zone dividing and the innermost radius Rmin is set as an innermost radius Rid in two-zone dividing.

Then, a divided position Rmd between the outermost radius Rod and the innermost radius Rid is determined by Equations (10) and (11) as follows (S2):

$$r=(x*Rod+Rid)/2 \quad (10)$$

$$k=Rod/Rid$$

$$x=(2*k^{1/2}-1)/k \quad (11)$$

Next, the divided position Rmd determined at S2 is set as the innermost radius Rid in two-zone dividing and the outermost radius Rmax is set as the outermost radius Rod in two-zone dividing.

Then, the divided position Rmd between the outermost radius Rod and the innermost radius Rid is determined by Equations (10) and (7) (S3).

This dividing method will be called minimum servo loss complex dividing. As illustrated in FIG. 8, the divided position PC in the minimum servo loss dividing and the divided position PD in minimum servo loss complex dividing almost coincide with each other.

A method for determining the divided positions by Equation (11) will be called constant FCI change dividing. The constant FCI change dividing is a dividing method with constant FCI change at zone boundaries. In constant FCI change dividing, the divided position r can be given by Equation (12) as follows:

$$r=(Rod+Rid)^{1/2}=(x*Rod+Rid)/2 \qquad (12)$$

Equation (12) can be solved for x to obtain Equation (11).

The provisional divided position Rod determined at S1 is on the outer peripheral side beyond the divided position Rmd determined at S3. However, the constant FCI change dividing method tends to increase the outer peripheral zone width more excessively than the minimum servo loss dividing method. Accordingly, the two opposing actions cancel each other out to derive almost the correct divided position.

In the case where the disc area cannot be divided into two zones, the even-numbered-zone dividing state can be set provisionally by the equal dividing. Then, the divided position is derived by constant FCI change dividing in such a manner that a trend of the opposing actions of the divided position cancel each other out, thereby coming close to minimum servo loss dividing.

Figure 11A:
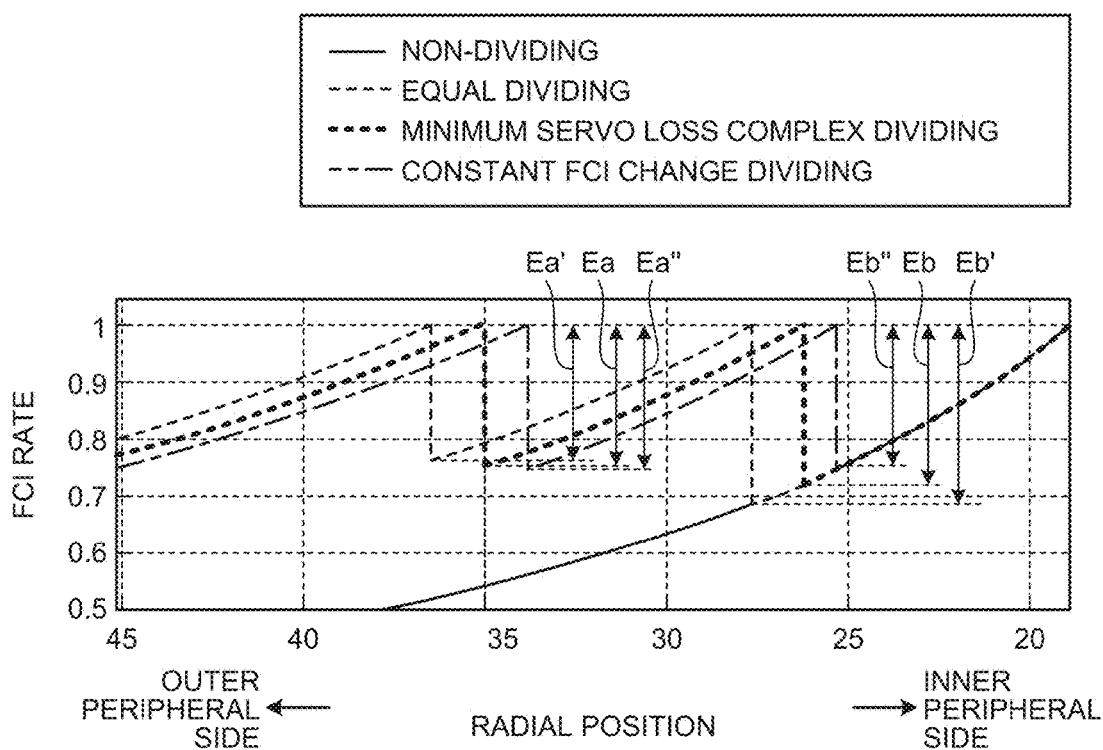
FIG. 11A is a diagram illustrating the relationship between three-zone divided positions with a servo pattern and FCI rate according to a third embodiment.
Figure 11B:
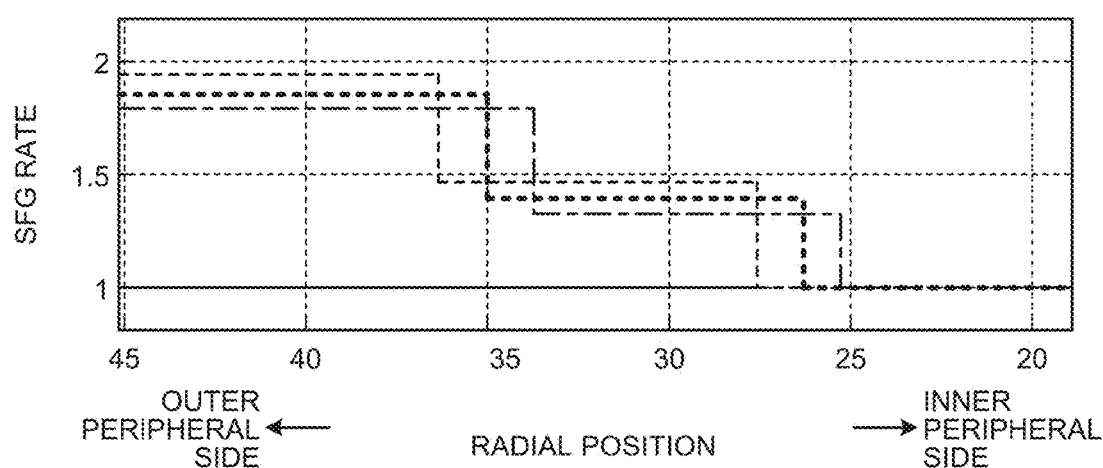
FIG. 11B is a diagram illustrating the relationship between three-zone divided positions with a servo pattern and SFG rate according to the third embodiment.
Figure 12A:
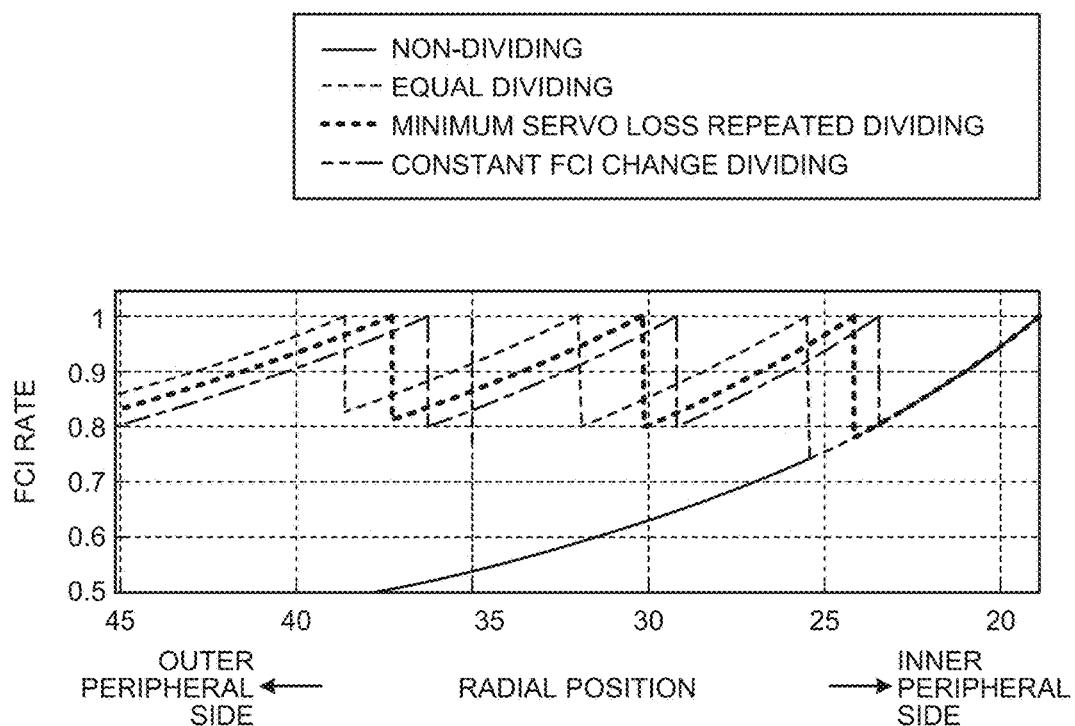
FIG. 12A is a diagram illustrating the relationship between four-zone divided positions with a servo pattern and FCI rate according to the third embodiment.
Figure 12B:
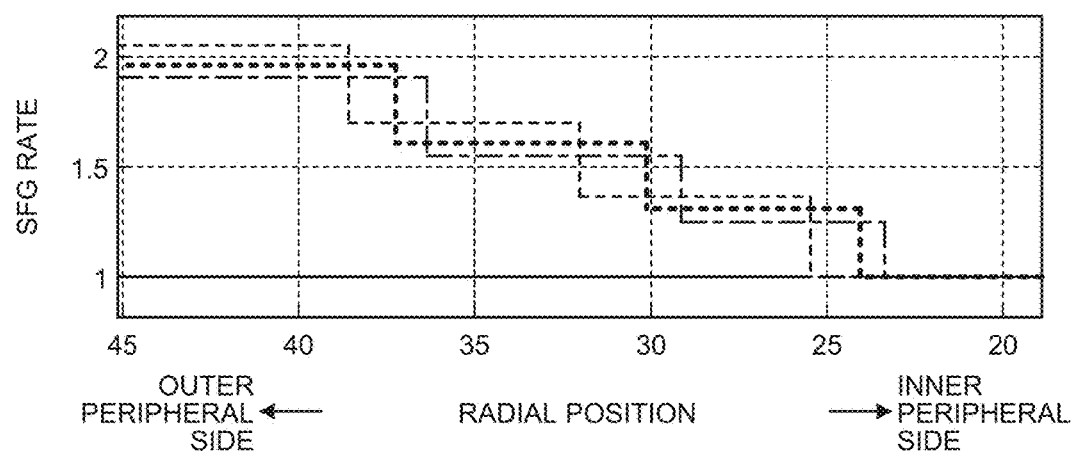
FIG. 12B is a diagram illustrating the relationship between four-zone divided positions with a servo pattern and SFG rate according to the third embodiment.
Figure 13A:
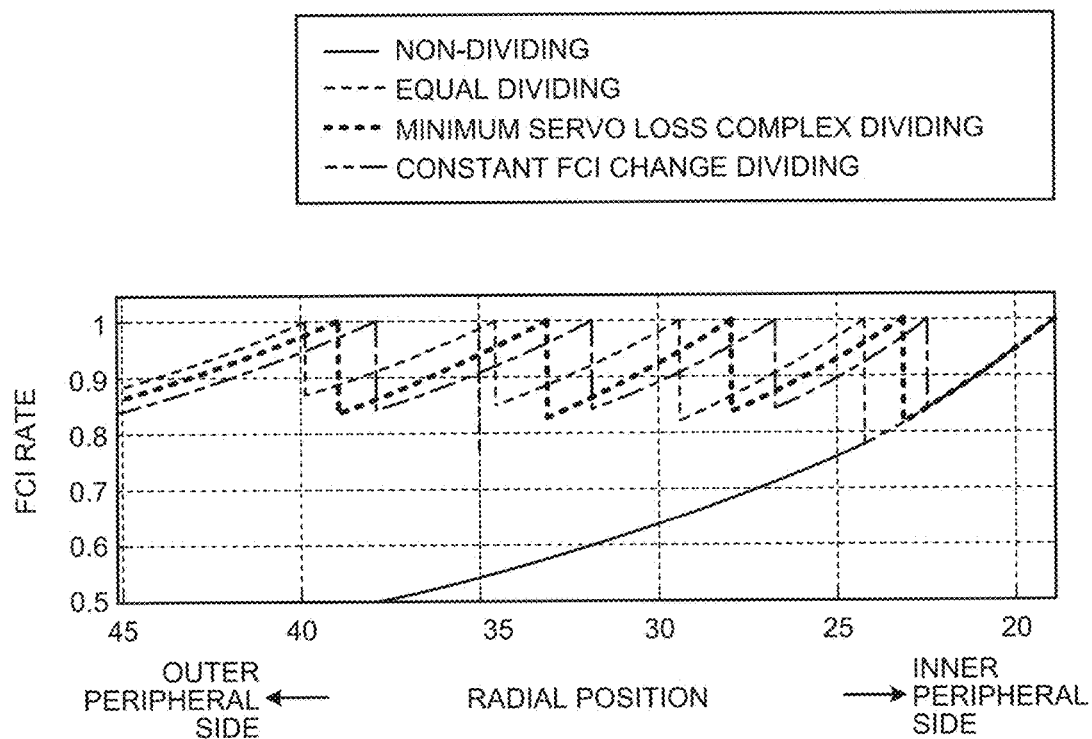
FIG. 13A is a diagram illustrating the relationship between five-zone divided positions with a servo pattern and FCI rate according to the third embodiment.
Figure 13B:
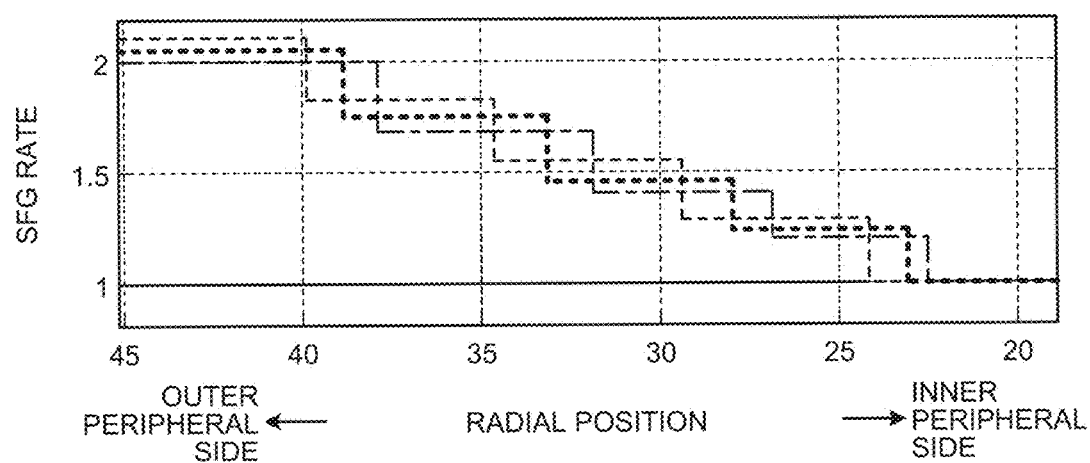
FIG. 13B is a diagram illustrating the relationship between five-zone divided positions with a servo pattern and SFG rate according to the third embodiment.
Figure 14A:
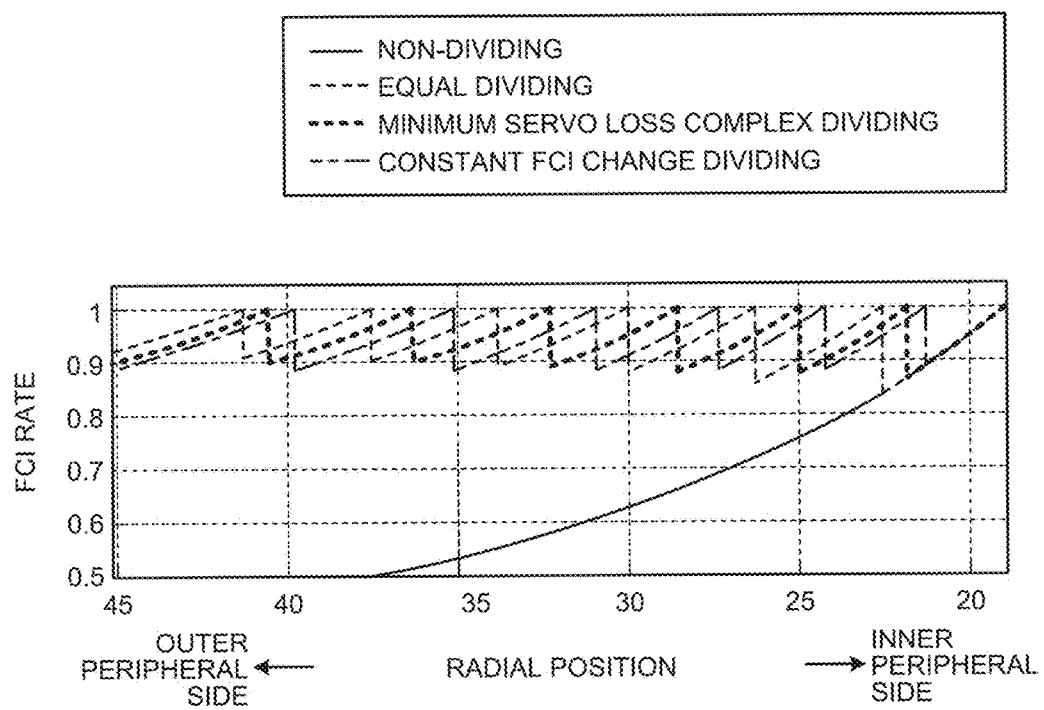
FIG. 14A is a diagram illustrating the relationship between seven-zone divided positions with a servo pattern and FCI rate according to the third embodiment.
Figure 14B:
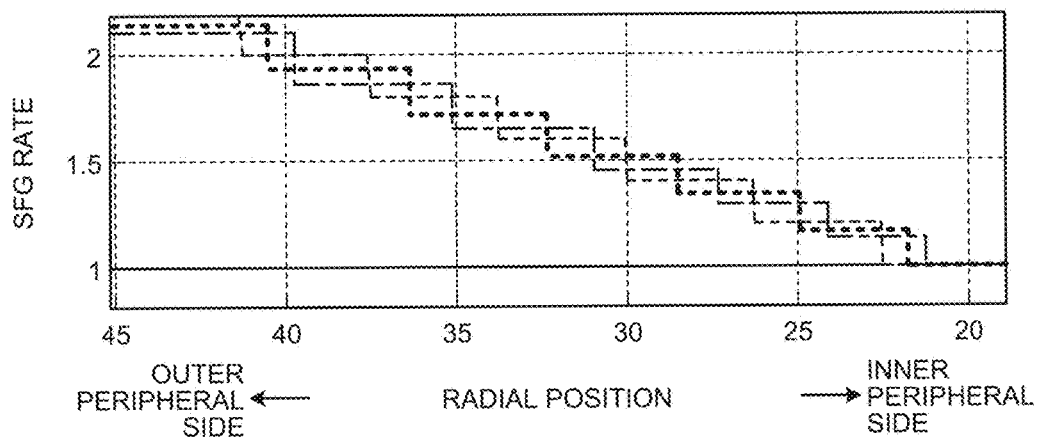
FIG. 14B is a diagram illustrating the relationship between seven-zone divided positions with a servo pattern and SFG rate according to the third embodiment.
Figure 15A:
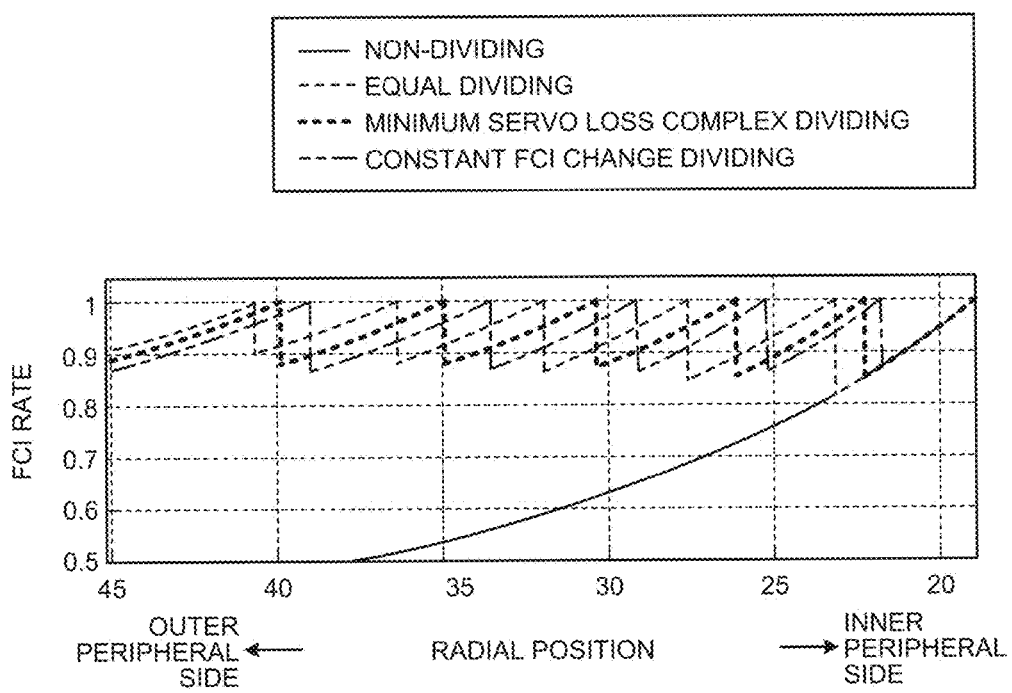
FIG. 15A is a diagram illustrating the relationship between six-zone divided positions with a servo pattern and FCI rate according to the third embodiment.
Figure 15B:
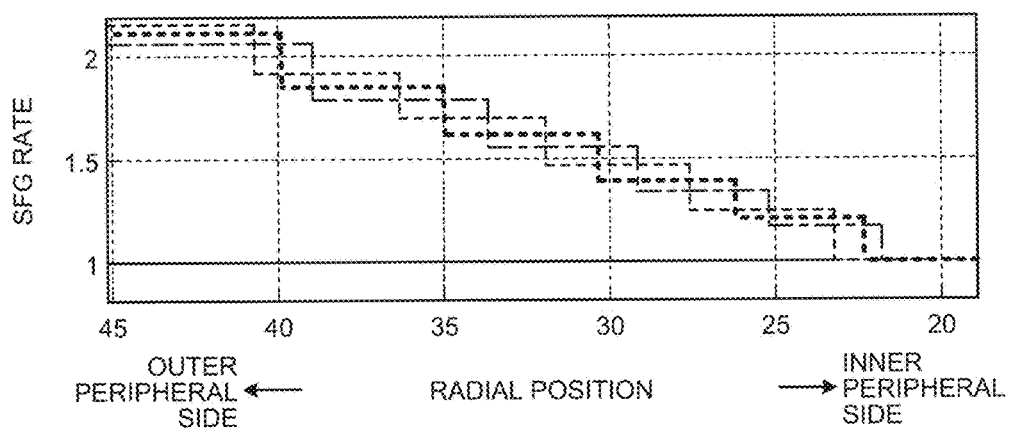
FIG. 15B is a diagram illustrating the relationship between six-zone divided positions with a servo pattern and SFG rate according to the third embodiment.
Figure 16A:
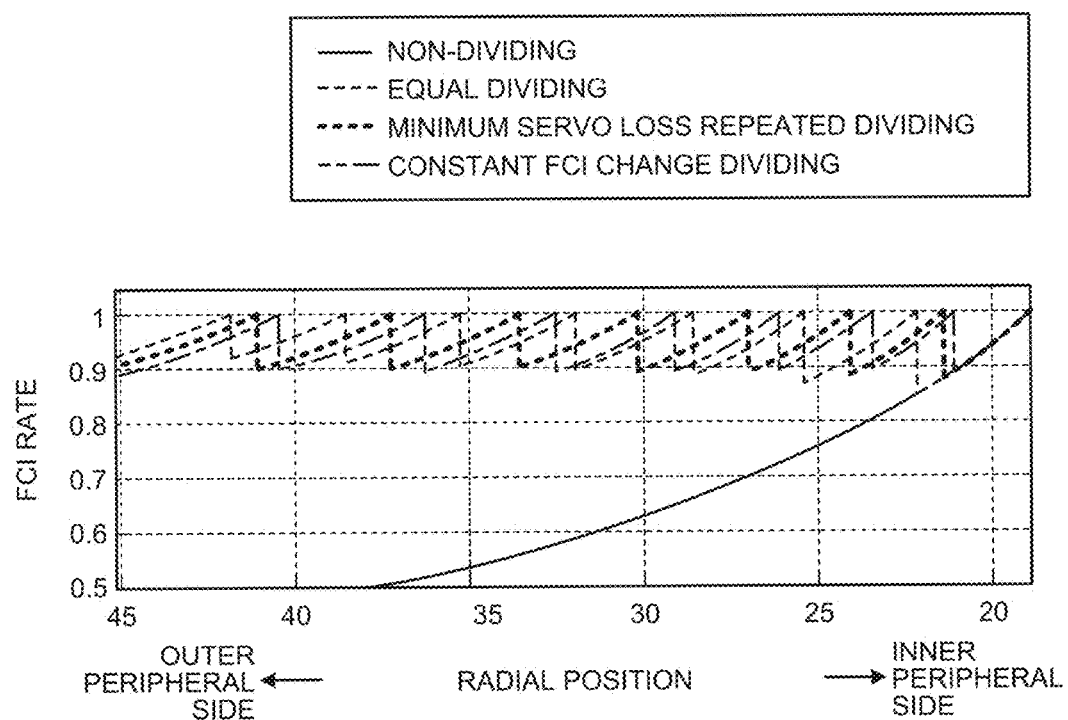
FIG. 16A is a diagram illustrating the relationship between eight-zone divided positions with a servo pattern and FCI rate according to the third embodiment.
Figure 16B:
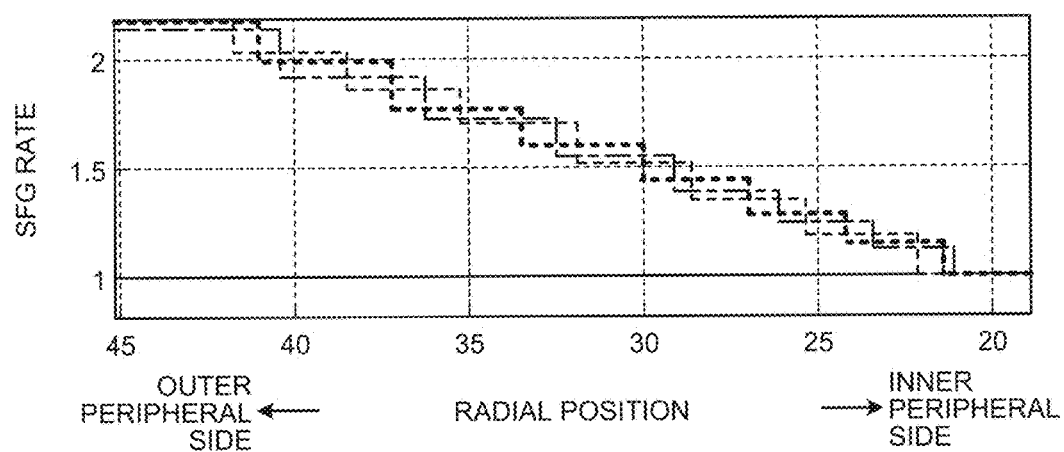
FIG. 16B is a diagram illustrating the relationship between eight-zone divided positions with a servo pattern and SFG rate according to the third embodiment.

FIG. 11A is a diagram illustrating the relationship between three-zone divided positions with a servo pattern and FCI rate according to a third embodiment, and FIG. 11B is a diagram illustrating the relationship between three-zone divided positions with a servo pattern and SFG rate according to the third embodiment.

Referring to FIG. 11A, when the FCI change at the outer peripheral zone boundary is designated as Ea and the FCI change at the inner peripheral zone boundary as Eb in the minimum servo loss complex dividing, the relationship Ea<Eb holds. When the FCI change at the outer peripheral zone boundary is designated as Ea' and the FCI change at the inner peripheral zone boundary as Eb' in the equal dividing, the relationship Ea'<Eb' holds. When the FCI change at the outer peripheral zone boundary is designated as Ea" and the FCI change at the inner peripheral zone boundary as Eb" in constant FCI change dividing, the relationship Ea"=Eb" holds.

In this case, the relationship Eb'−Ea'>Eb−Ea>Eb"−Ea"=0 holds. Specifically, the difference between the FCI change at the boundary between the first zone and the second zone from the inside and the FCI change at the boundary between the second zone and the third zone from the inside in the minimum servo loss complex dividing or constant FCI change dividing (Eb−Ea or Eb"−Ea") is smaller than the difference between the FCI change at the boundary between the first zone and the second zone from the inside and the FCI change at the boundary between the second zone and the third zone from the inside in the equal dividing (Eb'−Ea').

The constant FCI change dividing method tends to increase the outer peripheral zone width more excessively than the minimum servo loss dividing method. In constant FCI change dividing, the occupancy rate of the servo area is larger than that in the minimum servo loss dividing, but there is hardly a difference in servo loss between the two and the servo losses are smaller than that in the equal dividing. In particular, when the outer peripheral FCI can be significantly decreased and the quality of the servo playback signal after STW is insufficient even in the minimum servo loss dividing, selecting the constant FCI change dividing method, instead of decreasing the outer peripheral servo frequency, makes it possible to reduce the occupancy rate of the servo area. The minimum servo loss dividing method is preferable for two-zone dividing and three-zone dividing, but the constant FCI change dividing method is rather desired for four or more-zone dividing with high outer peripheral FCI.

Referring to FIG. 11B, the SFG rate in the first zone from the inside in the minimum servo loss complex dividing or constant FCI change dividing is equal to the SFG rate in the first zone from the inside in the equal dividing. The SFG rate in the second zone from the inside in the minimum servo loss complex dividing or constant FCI change dividing is lower than the SFG rate in the second zone from the inside in the equal dividing. The SFG rate in the third zone from the inside in the minimum servo loss complex dividing or constant FCI change dividing is lower than the SFG rate in the third zone from the inside in the equal dividing.

In constant FCI change dividing, the dividing radius can be determined by the simple theoretical formula in Equation (12). In addition, the dividing radius can be easily determined in N-zone dividing. When the dividing radius in N-zone dividing is designated as R(n), R(n) can be given by Equation (13) as follows:

$$R(n)=(Rmax/Rmin)^{(N-n/N)}*Rmin \qquad (13)$$

where n=1, 2, . . . , (N−1)

FIG. 10B is a diagram illustrating a method for four-zone dividing with a servo pattern according to the third embodiment.

Referring to FIG. 10B, in four-zone dividing, two-zone dividing is repeated to determine three divided positions. Specifically, the outermost radius Rmax is set to the outermost radius Rod in two-zone dividing, and the innermost radius Rmin is set to the innermost radius Rid in two-zone dividing. Then, the divided position Rmd between the outermost radius Rod and the innermost radius Rid is determined by Equation (10) (S11). In Equation (10), x=1 in the equal dividing. In Equation (10), x is determined by Equation (7) to implement minimum servo loss approximate dividing. In Equation (10), x is determined by Equation (11) to implement constant FCI change dividing.

Next, the outermost radius Rmax is set as the outermost radius Rod in two-zone dividing, and the divided position Rmd determined at S11 is set to the innermost radius Rid in two-zone dividing. Then, the divided position Rmd between the outermost radius Rod and the innermost radius Rid is determined by Equation (10) (S12).

Next, the divided position Rmd determined at S11 is set to the outermost radius Rod in two-zone dividing, and the innermost radius Rmin is set to the innermost radius Rid in two-zone dividing. Then, the divided position Rmd between the outermost radius Rod and the innermost radius Rid is determined by Equation (10) (S13).

The minimum servo loss dividing is desired from the viewpoint of reducing the occupancy rate of the servo area. However, the outer peripheral FCI is too high when the number of divided zones is four or more. With decrease in the SN ratio at the outer peripheral STW, it is difficult to assure the sufficient servo quality. Accordingly, when the number of divided zones is large, the weight x may be adjusted to come closer to the constant FCI change dividing, thereby decreasing the outer peripheral FCI.

Repeating two-zone dividing makes it easy to achieve $2^m$ (m is an integer of 1 or more)-zone dividing.

When the number of divided zones is a prime number H such as 3, 5, or 7, one of equally divided H zones is subtracted from the outer peripheral side or added to the outer peripheral side such that the number of divided zones is $2^m$ at the determination of the first divided position. Then, the divided positions can be determined in the area where the number of divided parts is adjusted to be $2^m$.

FIG. 10C is a diagram illustrating a method for five-zone dividing with a servo pattern according to the third embodiment.

Referring to FIG. 10C, the area between the outermost radius Rmax and the innermost radius Rmin is equally divided into five zones to set the provisional divided position Rod that is shifted inward by one divided zone from the outermost radius Rod (S21).

Next, the provisional divided position Rod determined at S21 is set to the outermost radius Rod in two-zone dividing, and the innermost radius Rmin is set to the innermost radius Rid in two-zone dividing.

Then, the provisional divided position Rmd between the outermost radius Rod and the innermost radius Rid is determined by Equation (10) (S22).

Next, the provisional divided position Rmd determined at S22 is set to the outermost radius Rod in two-zone dividing, and the innermost radius Rmin is set to the innermost radius Rid in two-zone dividing.

Then, the divided position Rmd is determined between the outermost radius Rod and the innermost radius Rid by Equation (10) (S23).

Next, the outermost radius Rmax is set to the outermost radius Rod in two-zone dividing, and the divided position Rmd determined at S23 is set to the innermost radius Rid in two-zone dividing. Then, the divided position Rmd between the outermost radius Rod and the innermost radius Rid is determined by Equation (10) (S24).

Next, the outermost radius Rmax is set to the outermost radius Rod in two-zone dividing, and the divided position Rmd determined at S24 is set to the innermost radius Rid in two-zone dividing. Then, the divided position Rmd between the outermost radius Rod and the innermost radius Rid is determined by Equation (10) (S25).

Next, the divided position Rmd determined at S24 is set to the outermost radius Rod in two-zone dividing, and the divided position Rmd determined at S23 is set to the innermost radius Rid in two-zone dividing. Then, the divided position Rmd between the outermost radius Rod and the innermost radius Rid is determined by Equation (10) (S26).

FIG. 10D is a diagram illustrating a method for seven-zone dividing with a servo pattern according to the third embodiment.

Referring to FIG. 10D, the area between the outermost radius Rmax and the innermost radius Rmin is equally divided into seven zones to set the provisional divided position Rod that is shifted outward by one divided zone from the outermost radius Rod (S31).

Next, the provisional divided position Rod determined at S31 is set to the outermost radius Rod in two-zone dividing, and the innermost radius Rmin is set to the innermost radius Rid in two-zone dividing.

Then, the divided position Rmd between the outermost radius Rod and the innermost radius Rid is determined by Equation (10) (S32).

Next, the divided position Rmd determined at S32 is set to the outermost radius Rod in two-zone dividing, and the innermost radius Rmin is set to the innermost radius Rid in two-zone dividing.

Then, the divided position Rmd between the outermost radius Rod and the innermost radius Rid is determined by Equation (10) (S33).

Next, the divided position Rmd determined at S33 is set to the outermost radius Rod in two-zone dividing, and the innermost radius Rmin is set to the innermost radius Rid in two-zone dividing. Then, the divided position Rmd between the outermost radius Rod and the innermost radius Rid is determined by Equation (10) (S34).

Next, the divided position Rmd determined at S32 is set to the outermost radius Rod in two-zone dividing, and the divided position Rmd determined at S33 is set to the innermost radius Rid in two-zone dividing. Then, the divided position Rmd between the outermost radius Rod and the innermost radius Rid is determined by Equation (10) (S35).

Next, the outermost radius Rmax is set to the outermost radius Rod in two-zone dividing, and the divided position Rmd determined at S35 is set to the innermost radius Rid in two-zone dividing. Then, the divided position Rmd between the outermost radius Rod and the innermost radius Rid is determined by Equation (10) (S36).

Next, the outermost radius Rmax is set to the outermost radius Rod in two-zone dividing, and the divided position Rmd determined at S36 is set to the innermost radius Rid in two-zone dividing. Then, the divided position Rmd between the outermost radius Rod and the innermost radius Rid is determined by Equation (10) (S37).

For six-zone dividing, three-zone dividing is performed while two zones are regarded as one zone, and then two-zone dividing is performed.

The zone width ratio comes closer to 1 with increase in N. Nevertheless, assuming three- to eight-zone dividing as practical, the minimum value of the zone width ratio is 1.0488 for eight-zone dividing. The upper limit of the zone width ratio is 1.1961 for three-zone dividing. However, the constant FCI change dividing method may be employed for four-zone dividing, and therefore the upper limit for the zone width ratio can be set to $(Rmax/Rmin)^{1/4} = 1.22428$.

FIGS. 12A to 16A are diagrams illustrating the relationship between four-, five-, seven-, six-, and eight-zone divided positions with a servo pattern and the FCI rate according to the third embodiment. FIGS. 12B to 16B are diagrams illustrating the relationship between four-, five-, seven-, six-, and eight-zone divided positions with a servo pattern and the SFG rate according to the third embodiment.

Referring to FIGS. 12A to 16A, in four-, five-, seven-, six-, and eight-zone dividing, the divided positions between the adjacent zones in the minimum servo loss repeated dividing and the minimum servo loss complex dividing are shifted to the inner peripheral side than the divided positions in the equal dividing. Accordingly, the outer peripheral servo frequency set under the inner peripheral FCI standard is lower in the minimum servo loss dividing than in the equal dividing. Accordingly, even with degradation in the quality of the SN ratio on the outer peripheral side, it is possible to lessen the outer peripheral FCI without lowering the servo frequency on the outer peripheral side as in the equal dividing.

Referring to FIGS. 12B to 16B, in four-, five-, seven-, six-, and eight-zone dividing, the SFG rates in the second and subsequent zones from the inside in the minimum servo loss repeated dividing or the constant FCI change dividing are lower than the SFG rates in the second and subsequent zones from the inside in the equal dividing.

FIG. 17 is a diagram illustrating the relationships among the number of divided zones with a servo pattern, servo loss rate, and area gain. The servo loss rate refers to the proportion of the servo zone in the entire writable area of the magnetic disc. The area gain refers to the increase rate of the data area to the non-dividing.

Referring to FIG. 17, when the zone boundary invalid width is 0 μm, the servo loss slightly decreases with increase in the number of divided zones from five to eight.

In contrast to this, when the zone boundary invalid width is 10 μm, the servo loss hardly decreases even with increase in the number of divided zones from five to eight and becomes saturated with five divided zones or more.

Meanwhile, with increase in the number of divided zones, the data amount of parameters in the zone servo method increases. Accordingly, the number of divided zones is preferably set to three or four in the zone servo method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disc apparatus comprising:
a magnetic disc having N (N is an integer of 2 or more) zones divided in a radial direction; and
a magnetic head provided for the magnetic disc, wherein servo patterns different in servo pattern frequency are recorded in the individual zones, and
relationship that a zone width of a K-th (K is an integer of 1 or more and N−1 or less) zone from an outer radial side of the magnetic disc is larger than a zone width of the K+1-th zone adjacent to the K-th zone on an inner diameter side applies to all the K-th zones in which K is 1 or more and N−1 or less.

2. The magnetic disc apparatus of claim 1, wherein, when the zone width of the K-th zone is designated as Wod and the zone width of the K+1-th zone is designated as Wid, relationship 1.25≥Wod/Wid>1.05 holds.

3. The magnetic disc apparatus of claim 1, wherein the zone width of the K-th zone is designated as Wod, the zone width of the K+1-th zone is designated as Wid, an outer radius of the K-th zone is designated as Rod, and an inner radius of the K+1-th zone is designated as Rid, relationship Wod/Wid=1−0.22 (Rod/Rid−1) holds.

4. The magnetic disc apparatus of claim 2, wherein, when the outer radius of the K-th zone is designated as Rod, the inner radius of the K+1-th zone is designated as Rid, a dividing radius between the K-th zone and the K+1-th zone is designated as r, and a weight is designated as x, relationships r=(x*Rod+Rid)/2, 2*(Rid/Rod)½−Rid/Rod≤x<1 hold.

5. The magnetic disc apparatus of claim 3, wherein, when the dividing radius between the K-th zone and the K+1-th zone is designated as r and the weight is designated as x, relationships r=(x*Rod+Rid)/2, x=1−0.05*(Rod/Rid−1)³⁄² hold.

6. The magnetic disc apparatus of claim 1, wherein the zone width is set such that servo area loss is minimum.

7. The magnetic disc apparatus of claim 6, wherein the N is 2 or 3.

8. The magnetic disc apparatus of claim 1, wherein, when the N is 3 or more, a change in flux change per inch (FCI) at a boundary between the K-th zone and the K+1-th zone and a change in FCI at a boundary between the K+1-th zone and a K+2-th zone are equal.

9. The magnetic disc apparatus of claim 8, wherein, when the outer radius of the K-th zone is designated as Rod and the inner radius of the K+1-th zone is designated as Rid, a dividing radius r between the K-th zone and the K+1-th zone is given by equations as follows:

$r=(x*Rod+Rid)/2$ $k=Rod/Rid$ $x=(2*k^{1/2}-1)/k.$

10. The magnetic disc apparatus of claim 1, wherein a servo frequency generation (SFG) rate of the K-th zone is lower than the SFG rate of the K-th zone in equal dividing.

11. The magnetic disc apparatus of claim 1, wherein, when an outer radius of the K-th zone is designated as Rod and an inner radius of the K+1-th zone is designated as Rid, a dividing radius r between the K-th zone and the K+1-th zone is given by equations as follows:

$r=(x*Rod+Rid)/2$ $x*(x+k)2-4*k=0$ $k=Rod/Rid.$

12. The magnetic disc apparatus of claim 1, wherein, when N=2m (m is an integer of 1 or more), divided positions of N zones are determined by repeating two-zone dividing.

13. The magnetic disc apparatus of claim 1, wherein
when N represents a prime number H, one of equally divided H zones at determination of the first divided position is subtracted from the outer peripheral side or added to the outer peripheral side such that the number of divided zones is 2m (m is an integer of 1 or more), and
two-zone dividing is repeated to determine the divided positions of the N zones.

14. The magnetic disc apparatus of claim 1, wherein
when N=3, an area between an outermost radius and an innermost radius before dividing is equally divided into three zones to set a provisional divided position on the outer peripheral side,
an area between the provisional divided position and the innermost radius before the dividing is divided into two zones to determine a first divided position, and
an area between the first divided position and the outermost radius before the dividing is divided into two zones to determine a second divided position.

15. The magnetic disc apparatus of claim 1, wherein
when N=4, an area between an outermost radius and an innermost radius before dividing is divided into two zones to determine a first divided position,
an area between the outermost radius before the dividing and the first divided position is divided into two zones to determine a second divided position, and
an area between the innermost radius before the dividing and the second divided position is divided into two zones to determine a third divided position.

16. The magnetic disc apparatus of claim 1, wherein
when N=5, an area between an outermost radius and an innermost radius before dividing is equally divided into five zones to set a first provisional divided position on the outer peripheral side shifted inward by one divided zone from the outermost radius, an area between the innermost radius before the dividing and the first provisional divided position is divided into two zones to set a second provisional divided position, an area between the innermost radius before the dividing and the second provisional divided position is divided into two zones to determine a first divided position, an area between the outermost radius before the dividing and the first divided position is divided into two zones to determine a second divided position, an area between the outermost radius before the dividing and the second divided position is divided into two zones to determine a third divided position, and an area between the first divided position and the second divided position is divided into two zones to determine a fourth divided position.

17. The magnetic disc apparatus of claim 1, wherein, when N=6, an area between an outermost radius and an innermost radius before dividing is divided into three zones and the three divided zones are each further divided into two zones.

18. The magnetic disc apparatus of claim 1, wherein when N=7, an area between an outermost radius and an innermost radius before dividing is equally divided into seven zones to set a first provisional divided position on the outer peripheral side shifted outward by one divided zone from the outermost radius, an area between the innermost radius before the dividing and the first provisional divided position is divided into two zones to determine a first divided position, an area between the innermost radius before the dividing and the first divided position is divided into two zones to determine a second divided position, an area between the innermost radius before the dividing and the second divided position is divided into two zones to determine a third divided position, an area between the first divided position and the second divided position is divided into two zones to determine a fourth divided position, an area between the outermost radius before the dividing and the fourth divided position is divided into two zones to determine a five divided position, and an area between the outermost radius before the dividing and the fifth divided position is divided into two zones to determine a sixth divided position.

19. The magnetic disc apparatus of claim 1, comprising an invalid section that is arranged along a boundary between the K-th zone and the K+1-th zone and is incapable of access as a data area.

20. The magnetic disc apparatus of claim 19, wherein a servo pattern in the K-th zone and a servo pattern in the K+1-th zone overlap in the invalid section.

\* \* \* \* \*